Judson R. Griffin
Donald L. Martin Jr.
Robert E. Siron,
INVENTORS

United States Patent Office 3,745,051
Patented July 10, 1973

3,745,051
QUADRUPLE LAP SIMPLE SHEAR
TEST SPECIMEN
Judson R. Griffin, Huntsville, Donald L. Martin, Jr., Albertville, and Robert E. Siron, Huntsville, Ala., assignors to the United States of America as represented by the Secretary of the Army
Filed Nov. 9, 1971, Ser. No. 197,000
Int. Cl. B32b 3/02
U.S. Cl. 161—44      3 Claims

ABSTRACT OF THE DISCLOSURE

A simple shear test specimen having two aligned load plates. A piece of material to be tested bonded to each of the outer surfaces of each load plate and two side plates one bonded to the outer surface of one of the pieces of material to be tested on each load plate and the other bonded to the outer surfaces of the other two pieces of material to be tested.

BACKGROUND OF THE INVENTION

Prior to conception and development of the optimum configuration being disclosed herein, the only simple shear specimen known were the single and double lap shear specimens. Both of those configurations had drawbacks. The single lap specimen could not be loaded axially. The double lap configuration imposed bending stresses on the test specimen material. Due to rotational forces imposed on the bonded interface, the specimens usually failed by peeling at or near the interface in other than a state of simple shear. It is therefore an object of this invention to provide a test specimen wherein axial loading may be applied to the specimen without the tendency of the specimen to peel at the bonded interface between the loading plates and the specimen.

DETAILED DESCRIPTION OF THE INVENTION

Figure 1:
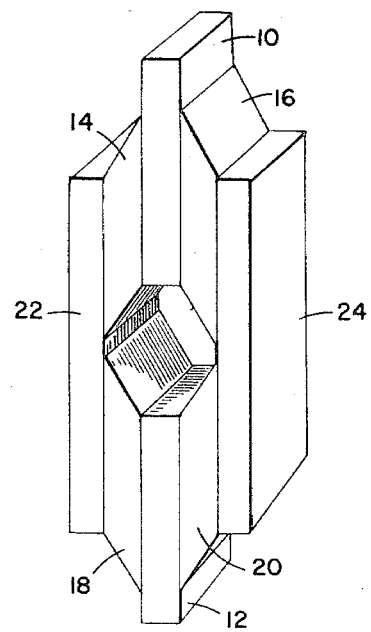
FIG. 1 of the drawing is a perspective showing the completed test specimen before testing thereof.
Figure 2:
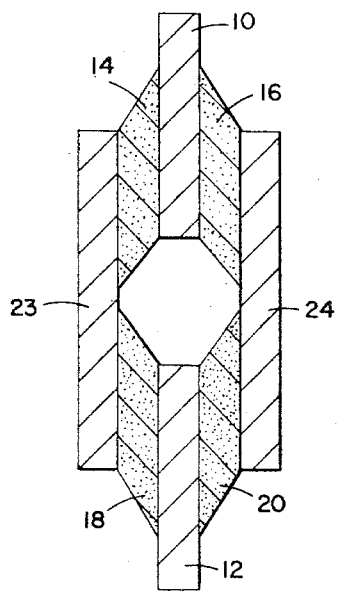
FIG. 2 of the drawing shows a section through the test specimen illustrated in FIG. 1 showing the different materials used therein.

Referring now to the drawings the test specimen of the present invention embodies two load plates 10 and 12. Four identical test pieces 14, 16, 18 and 20 are bonded to the outer surfaces of the load plates 10 and 12 in the manner illustrated in the drawings. Two side plates 22 or 23 and 24 are bonded to the outer surfaces of the test pieces 14, 16, 18 and 20 in the manner illustrated. The upper and lower ends of the test pieces are cut on a diagonal of approximately 60° in order to form a chevron type configuration as illustrated in the drawings.

In the use of the test specimen illustrated a load is applied under tension to the load plates 10 and 12 thus tending to pull these plates apart. The test pieces 14, 16, 18 and 20 are free to contract laterally as the tension forces are applied thereto. The deflection of the test pieces in a lateral direction can be correlated for given applications of load to the load plates 10 and 12 thus giving a very clear and accurate picture of the shear strength of the material 14, 16, 18 and 20 being tested.

While the invention has been described in connection with solid propellant test pieces 14, 16, 18 and 20 it should be realized that the configuration described herein is equally applicable to the shear testing of any type of plastic material such as plastics, polymeric or rubbery materials.

We claim:

1. An article used for testing the shear strength of a plastic material comprising:
    four identical pieces of test material;
    two loading plates, two of said test pieces being bonded one on either side of each loading plate;
    two side plates, one bonded to the outer surfaces of one of the test pieces on each loading plate, the other bonded to the outer surface of the other two test pieces;
    whereby axial tension on the loading plates will cause failure under shear in one of the pieces.

2. The article as set forth in claim 1, wherein the test pieces are approximately one half inch thick.

3. The article set forth in claim 2, wherein the ends of the test pieces are beveled at an angle of 60°.

References Cited

UNITED STATES PATENTS 3,401,446  9/1968  Obeda et al. _____ 156—344
3,533,154  10/1970  Wald _____ 156—344 X WILLIAM A. POWELL, Primary Examiner U.S. Cl. X.R.
73—432; 156—64, 378; 161—149